(12) United States Patent
Hong et al.

(10) Patent No.: US 11,781,262 B2
(45) Date of Patent: Oct. 10, 2023

(54) DRIVING PART ASSEMBLY AND TOP-LOADER WASHER THEREOF

(71) Applicant: LG ELECTRONICS INC., Seoul (KR)

(72) Inventors: Young Woo Hong, Seoul (KR); Doyoung Rhyu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 699 days.

(21) Appl. No.: 16/934,451

(22) Filed: Jul. 21, 2020

(65) Prior Publication Data
US 2021/0047767 A1 Feb. 18, 2021

(30) Foreign Application Priority Data

Aug. 14, 2019 (KR) .......................... 10-2019-0099717

(51) Int. Cl.
*D06F 37/30* (2020.01)
*F16D 23/00* (2006.01)
*D06F 23/04* (2006.01)

(52) U.S. Cl.
CPC .............. *D06F 37/30* (2013.01); *D06F 23/04* (2013.01); *F16D 23/00* (2013.01)

(58) Field of Classification Search
CPC ........... D06F 37/30; D06F 23/04; F16D 23/00
See application file for complete search history.

(56) References Cited

U.S. PATENT DOCUMENTS

| | | | |
|---|---|---|---|
| 2004/0031294 A1* | 2/2004 | Lim | D06F 13/08 68/133 |
| 2015/0107382 A1* | 4/2015 | Chang | F16H 37/12 74/17 |
| 2016/0108574 A1* | 4/2016 | Liu | F16H 1/32 475/269 |
| 2017/0191203 A1* | 7/2017 | Kim | D06F 37/30 |
| 2020/0018390 A1* | 1/2020 | Chi | F16H 57/021 |

(Continued)

FOREIGN PATENT DOCUMENTS

| | | |
|---|---|---|
| CN | 1212303 | 3/1999 |
| CN | 1746403 | 3/2006 |

(Continued)

OTHER PUBLICATIONS

Notice of Allowance in Chinese Appln. No. 202010105357.5, dated Aug. 1, 2022, 10 pages (with English translation).

*Primary Examiner* — David M Fenstermacher
(74) *Attorney, Agent, or Firm* — Fish & Richardson P.C.

(57) ABSTRACT

A driver assembly of a top-loader washer includes: a bearing housing provided under an outer tub and having a bolt screwed into a lower surface of the bearing housing, a stator provided under the bearing housing and defining a first hole, a clutch stopper interposed between the bearing housing and the stator and defining a second hole, a first sleeve coupled to the first hole, and a second sleeve coupled to the second hole. The bolt is inserted into the first sleeve through the first hole and into the second sleeve through the second hole to fasten the bearing housing, the clutch stopper, and the stator and the second sleeve is spaced apart from the bearing housing based on the first sleeve and the second sleeve being fastened to and in contact with each other by a fastening force of the bolt.

20 Claims, 15 Drawing Sheets

(56) References Cited

U.S. PATENT DOCUMENTS

| | | | |
|---|---|---|---|
| 2020/0048812 A1* | 2/2020 | Chupka | F16H 1/2827 |
| 2020/0131686 A1* | 4/2020 | Lee | F16D 27/09 |
| 2021/0040672 A1* | 2/2021 | Hu | F16H 57/082 |
| 2021/0047767 A1* | 2/2021 | Hong | D06F 37/304 |
| 2021/0071720 A1* | 3/2021 | Craig | F16D 21/00 |
| 2021/0123179 A1* | 4/2021 | Chi | F16C 33/583 |
| 2021/0131004 A1* | 5/2021 | Lee | D06F 37/30 |
| 2021/0189628 A1* | 6/2021 | Choi | D06F 37/40 |
| 2021/0277573 A1* | 9/2021 | Choi | D06F 23/04 |
| 2022/0074104 A1* | 3/2022 | Lee | F16D 27/118 |
| 2022/0127776 A1* | 4/2022 | Park | D06F 39/083 |
| 2022/0178066 A1* | 6/2022 | Roetker | D06F 23/04 |
| 2023/0060426 A1* | 3/2023 | Goshgarian | F16C 17/026 |
| 2023/0080493 A1* | 3/2023 | Lee | D06F 37/304 68/12.14 |

FOREIGN PATENT DOCUMENTS

| | | |
|---|---|---|
| CN | 1824878 | 8/2006 |
| CN | 201461703 | 5/2010 |
| CN | 102115965 | 7/2011 |
| CN | 102220682 | 10/2011 |
| CN | 102549207 | 7/2012 |
| CN | 203034148 | 7/2013 |
| CN | 104838566 | 8/2015 |
| JP | 2011080728 | 4/2011 |
| KR | 1020050064926 | 6/2005 |
| KR | 1020190063259 | 6/2019 |
| WO | WO2008126214 | 10/2008 |

\* cited by examiner

Related Art

DRIVING PART ASSEMBLY AND TOP-LOADER WASHER THEREOF

CROSS-REFERENCE TO RELATED APPLICATION

This present application claims benefit of priority to Korean Patent Application No. 10-2019-0099717, entitled "DRIVING PART ASSEMBLY AND TOP-LOADER WASHER THEREOF," filed on Aug. 14, 2019, in the Korean Intellectual Property Office, the entire disclosure of which is incorporated herein by reference.

BACKGROUND

1. Technical Field

The present disclosure relates to a driver assembly and a top-loader washer including the same.

2. Description of Related Art

As standards of living have improved, household appliances have become a major factor that greatly affects the acoustic environment of residential environments. In particular, among household appliances, a washer is one product that generates loud noise. For this reason, studies relating to low noise and low vibration for washers are actively being conducted.

In recent years, there has been a trend for increasing capacity and speeding up spin-drying of washers. However, as a side effect of this, vibration and noise of the product are increasing.

In top-loader washers, defects related to vibration and noise account for more than 30% of total defect factors. Most noise generated in the top-loader washers occurs in a process of vibration generated in a motor being transmitted to peripheral parts.

In this regard, Korean Patent Application Publication No. 10-2005-0064926 (hereinafter referred to as 'Related Art 1') discloses a stator fastening structure in a full automation-type washing machine. Related Art 1 was filed by the present applicant.

Referring to Related Art 1, a stator fastening hole is formed in a fastening protrusion of a stator. A stopper fastening hole is formed in a stopper. A housing fastening hole is formed in a lower clutch housing. A female thread is formed in the housing fastening hole. A bolt passes through the stator fastening hole and the stopper fastening hole and is screwed into the housing fastening hole. The stator, the stopper, and the lower clutch housing are sequentially fastened by the bolt.

The stator may vibrate due to factors (hereinafter referred to as 'vibration factors') such as eccentricity of a washing tub, or mutual electromagnetic repulsive force with a rotor. Laundry moves around in an inner tub during washing and spin-drying. Therefore, the laundry may not be distributed completely symmetrically about a rotation axis of the rotor in the inner tub during washing and spin-drying. Therefore, it may not possible to completely eliminate vibration of the stator caused by the vibration factors.

When the fastening structure of the stator and the clutch housing becomes loose, the size of a gap between the stator and the rotor fluctuates. The fluctuation the size of the gap between the stator and the rotor is a major cause of amplifying vibration and noise caused by the vibration factors.

Related Art 1 is provided with an unfastening-preventing washer between the bolt and the fastening protrusion to prevent the phenomenon of loosening of the fastening structure. That is, Related Art 1 discloses a technology for suppressing amplification of vibration and noise by preventing the fluctuation the size of the gap between the stator and the rotor.

However, Related Art 1 does not disclose a technology for reducing noise itself caused by the vibration factors. Accordingly, the present applicant has studied a method for reducing noise itself caused by the vibration factors.

In this regard, Korean Patent Application Publication No. 10-2019-0063259 (hereinafter referred to as 'Related Art 2') discloses a washing machine. Related Art 2 was filed by the present applicant.

Referring to Related Art 2, a driver 1000 includes a washing shaft 1410, a spin-drying shaft 1420, a bearing housing 1100, and a driving motor.

As shown in FIG. 2, fastening holes 1102 into which a fastening member BT' is inserted are formed in a lower surface of the bearing housing 1100. A fastening boss 1510 that is fixed to the bearing housing 1100 is formed on a clutch stopper 1500.

A fastening protrusion is formed on the stator 1200. A fastening hole is formed in the fastening protrusion. The fastening member BY inserted into the fastening hole and the fastening boss 1510 is fastened to the bearing housing 1100. Therefore, the bearing housing 1100, the clutch stopper 1500, and the stator 1200 are fixed together.

As shown in FIG. 2, a sleeve (hereinafter referred to as a 'sleeve A 1512') is inserted into the fastening boss 1510. The sleeve A 1512 may be inserted into the fastening boss 1510 by insert injection. The sleeve A 1512 has a hollow cylindrical shape.

The sleeve A 1512 is made of metal. The sleeve A 1512 is inserted into the through-hole of the fastening boss 1510, thereby reinforcing the strength of the fastening boss 1510. Although not disclosed in Related Art 2, in actual products, a sleeve B (hereinafter referred to as a 'sleeve B 1212') is also inserted into the fastening hole. The sleeve A 1512 and the sleeve B 1212 have the same cylindrical shape.

The stator 1200 is fixed to the bearing housing 1100 by three fastening members Br. In Related Art 2, the driver 1000 is fixed by three fastening members BY, thereby reducing an amount of vibration transmission compared to the driver fixed by six fastening members Br.

However, when the number of fastening members BY is reduced, vibration energy applied to one fastening member BY increases. Therefore, when the number of fastening members BY is reduced, the strength of the fastening member BY and the sleeve needs to be reinforced.

As shown in FIGS. 2 and 3, the sleeve A 1512 protrudes about 1 mm from an upper surface of the fastening boss 1510 to reduce the area where the upper surface of the fastening boss 1510 is in contact with the lower surface of the bearing housing 1100. The fastening member BY passes through the sleeve A 1512 and the sleeve B 1212 and is fixed to the lower surface of the bearing housing 1100.

Related Art 2 discloses a configuration that reduces the area where vibration energy generated in a driving motor is transmitted to the bearing housing 1100 through the clutch stopper 1500, by protruding the sleeve A 1512 by about 1 mm from the upper surface of the fastening boss 1510.

However, according to the results of an analysis of noise of the washer actually conducted by the present applicant, most noise generated in the driver 1000 was generated in (1) a contact surface between the sleeve A 1512 and the bearing housing 1100, and (2) a contact surface between the fastening member BT' and the sleeve A 1512 and the sleeve B 1212.

The fastening member BT', the sleeve A 1512, the sleeve B 1212, and the bearing housing 1100 are all made of metal. That is, most noise generated in the driver 1000 may be summarized as being generated in the contact surface between metals of the fastening portions. Accordingly, the present applicant has studied a method capable of securing the strength of the fastening portion while reducing the contact surface area between metals of the fastening portions.

RELATED ART DOCUMENTS

Korean Patent Application Publication No. 10-2015-0064926 (Jun. 29, 2005)
Korean Patent Application Publication No. 10-2019-0063259 (Jun. 7, 2019)

SUMMARY OF THE INVENTION

The present disclosure is directed to providing a driver assembly and a top-loader washer including the same, which may reduce noise itself caused by vibration factors.

The present disclosure is further directed to providing a driver assembly and a top-loader washer including the same, which may reduce the number of bolts and reduce noise without increasing thicknesses of the bolts and a sleeve.

The present disclosure is further directed to providing a driver assembly and a top-loader washer including the same, which may secure the strength of a fastening portion while reducing a contact surface area between metals of fastening portions.

According to an embodiment of the present disclosure, a driver assembly is configured such that even when a first sleeve and a second sleeve are in close contact with each other by a fastening force of a bolt, the second sleeve is spaced apart from a bearing housing. Therefore, it is possible to reduce noise itself caused by vibration factors.

According to this embodiment of the present disclosure, the driver assembly may include the bearing housing, a stator, and a clutch stopper.

The bearing housing may be provided under an outer tub. The bolt may be screwed into a lower surface of the bearing housing.

The stator may be provided under the bearing housing. A first hole may be formed in the stator.

The clutch stopper may be interposed between the bearing housing and the stator. A second hole may be formed in the clutch stopper.

A first sleeve may be coupled to the first hole. The first sleeve may be coupled to the first hole by insert injection.

A second sleeve may be coupled to the second hole. The second sleeve may be coupled to the second hole by insert injection.

The bolt may be inserted into the first sleeve and the second sleeve to fasten the bearing housing, the clutch stopper, and the stator.

Even when the first sleeve and the second sleeve are in close contact with each other by a fastening force of the bolt, the second sleeve may be spaced apart from the bearing housing.

The second sleeve may include a ring portion and a tubular portion.

The ring portion may be in close contact with a top surface of the first sleeve.

The tubular portion may extend upward from the ring portion. The tubular portion may be spaced apart from the bearing housing.

The upper surface of the ring portion may form an annular contact surface with the clutch stopper. Therefore, the tubular portion may be not pushed toward the bearing housing, so that even when the first sleeve and the second sleeve are in close contact with each other by the fastening force of the bolt, the second sleeve may be kept spaced apart from the bearing housing.

The lower surface of the ring portion may form a contact surface with the stator around the first sleeve. Therefore, relative movement in a horizontal direction between the first sleeve and the second sleeve that is caused by vibration energy of the stator may be suppressed.

The clutch stopper may include a boss portion forming the second hole. A lower surface of the boss portion may form a contact surface with the stator around the ring portion.

The clutch stopper may be in close contact with the bearing housing around a top of the second hole by the fastening force of the bolt. Therefore, the clutch stopper and the bearing housing may secure the strength of a fastening portion without forming a contact surface between metals.

The bolt may include a thread, a head, and a body.

The thread may be screwed into the bearing housing. The thread may be spaced apart vertically from the first sleeve and the second sleeve.

The head may push the stator toward the bearing housing.

The body may connect the thread and the head. The body may be horizontally spaced from the first sleeve and the second sleeve. Therefore, it is possible to reduce the contact surface area between metals of the fastening portions.

In addition, according to another embodiment of the present disclosure, a driver assembly is configured such that a sleeve is spaced apart from a bearing housing. Therefore, it is possible to reduce noise itself caused by vibration factors.

According to this embodiment of the present disclosure, the driver assembly may include the bearing housing, a stator, and a clutch stopper.

The bearing housing may be provided under an outer tub. A bolt may be screwed into a lower surface of the bearing housing.

The stator may be provided under the bearing housing. A first hole may be formed in the stator.

The clutch stopper may be interposed between the bearing housing and the stator. A second hole may be formed in the clutch stopper.

The sleeve may be coupled to the second hole. The sleeve may be coupled to the second hole by insert injection.

The sleeve may include a coupling portion, an insertion portion, and an extension portion.

The coupling portion may be coupled to the second hole.

The insertion portion may be inserted into the first hole.

The bolt may be inserted into the sleeve to fasten the bearing housing, the clutch stopper, and the stator.

The extension portion may protrude from an outer surface of a bottom of the coupling portion.

An upper surface of the extension portion may form an annular contact surface with the clutch stopper. Therefore, the coupling portion is not pushed toward the bearing housing, so that the second sleeve may be kept spaced apart from the bearing housing.

The lower surface of the extension portion may form a contact surface with the stator around the insertion portion. Therefore, relative movement in a horizontal direction between the bolt and the sleeve that is caused by vibration energy of the stator may be suppressed.

The clutch stopper may include a boss portion forming the second hole. A lower surface of the boss portion may form a contact surface with the stator around the extension portion.

Meanwhile, according to still another embodiment of the present disclosure, the top-loader washer may include the driver assembly.

According to the embodiments of the present disclosure, even when the first sleeve and the second sleeve are in close contact with each other by the fastening force of the bolt, the second sleeve may be spaced apart from the bearing housing, so that the second sleeve and the bearing housing that are made of metal may not come into with each other. In addition, the clutch stopper may be in close contact with the bearing housing around the top of the second hole by the fastening force of the bolt. Therefore, the vibration energy of the stator may be dissipated in the process of being transferred to the bearing housing through the boss portion made of synthetic resin.

According to the embodiments of the present disclosure, the thread may be spaced vertically apart from the first sleeve and the second sleeve, and the body may be spaced apart horizontally from the first sleeve and the second sleeve. Accordingly, collisions between the first sleeve and the second sleeve and the bolt due to vibration of the stator may be prevented. Therefore, noise caused by the collisions between the first sleeve and the second sleeve and the bolt may be reduced.

According to the embodiments of the present disclosure, the upper surface of the ring portion may form an annular contact surface with the clutch stopper, thereby reducing relative movement and relative rotation between the boss portion and the stator. In addition, the ring portion may reinforce the strength of the second sleeve at a portion in close contact with the first sleeve. Therefore, it is possible to secure the strength of the fastening portion while reducing the contact surface area between the first sleeve and the second sleeve.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Wherever possible, the same reference numbers will be used throughout the drawings to refer to the same or like parts. In the following description, known functions or structures, which may confuse the substance of the present disclosure, are not explained.

Figure 4:
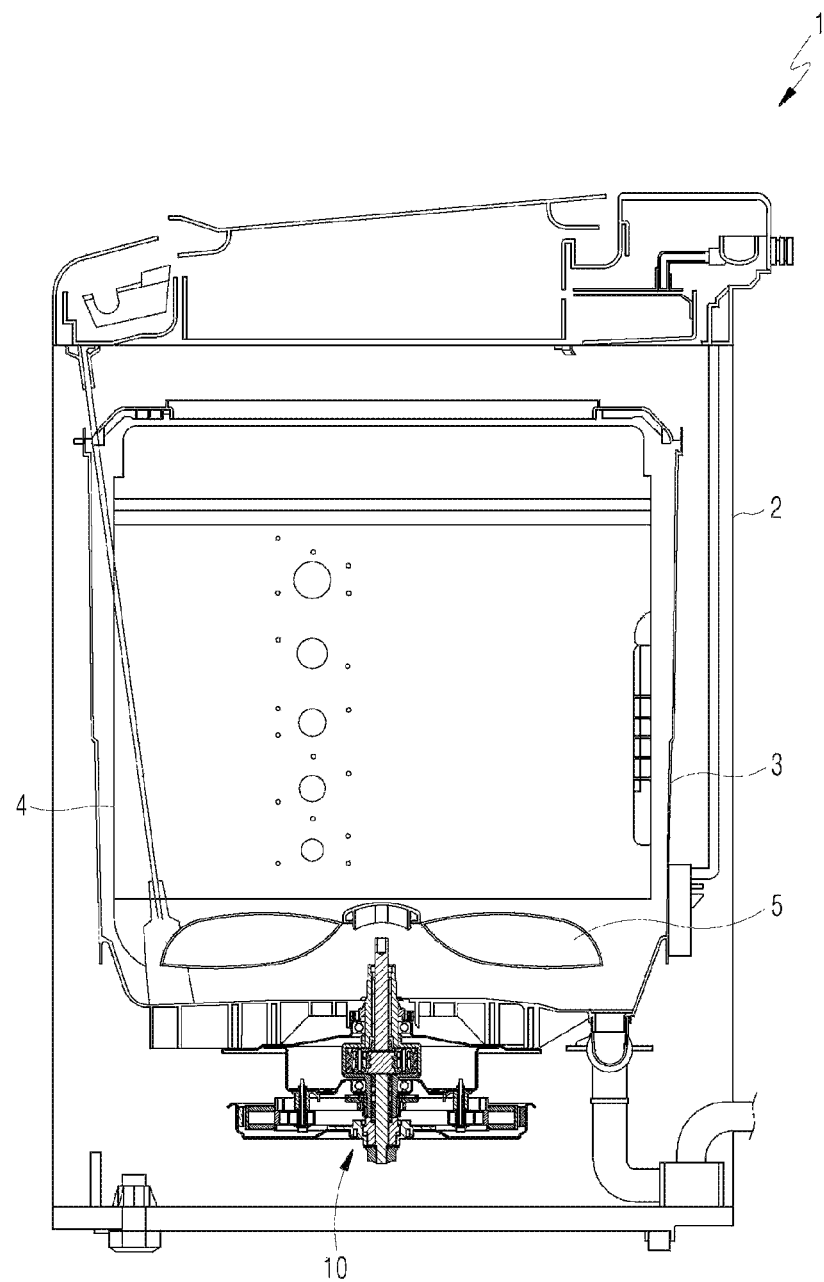
FIG. 4 is a cross-sectional view illustrating a top-loader washer according to an embodiment of the present disclosure.
Figure 5:
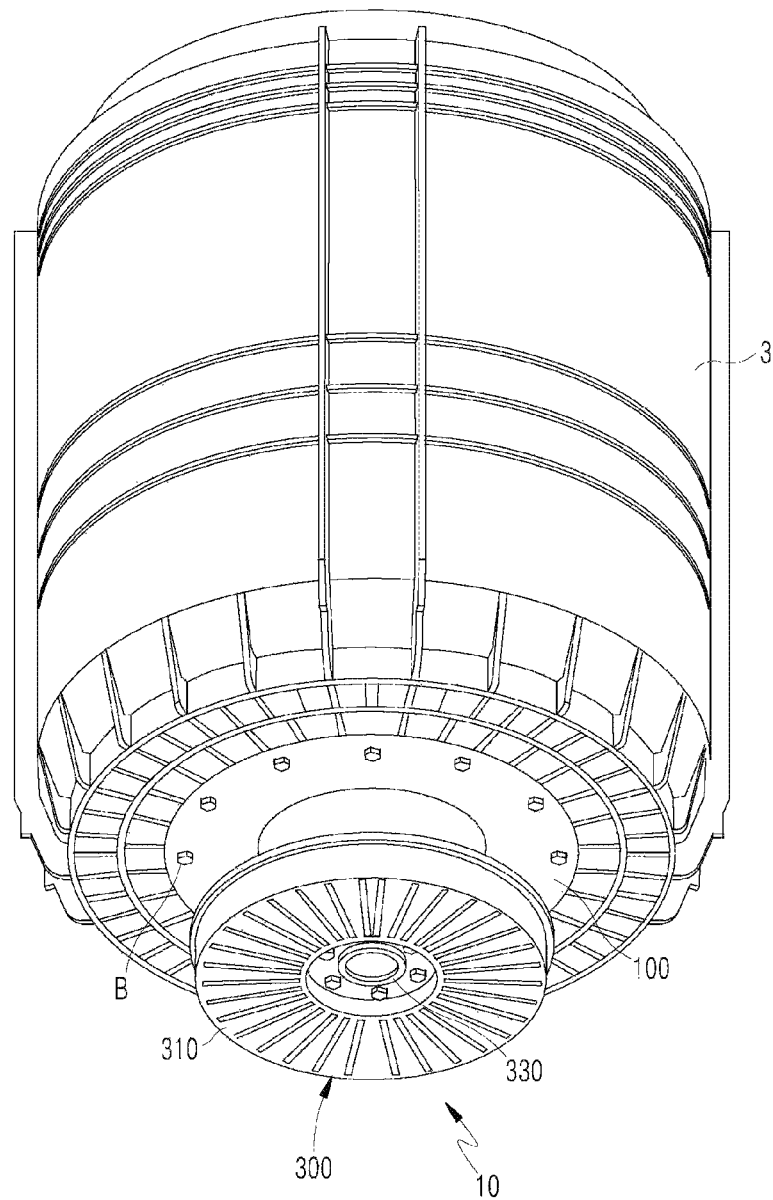
FIG. 5 is a bottom perspective view illustrating an outer tub and a driver assembly of the top-loader washer of FIG. 4.
Figure 6:
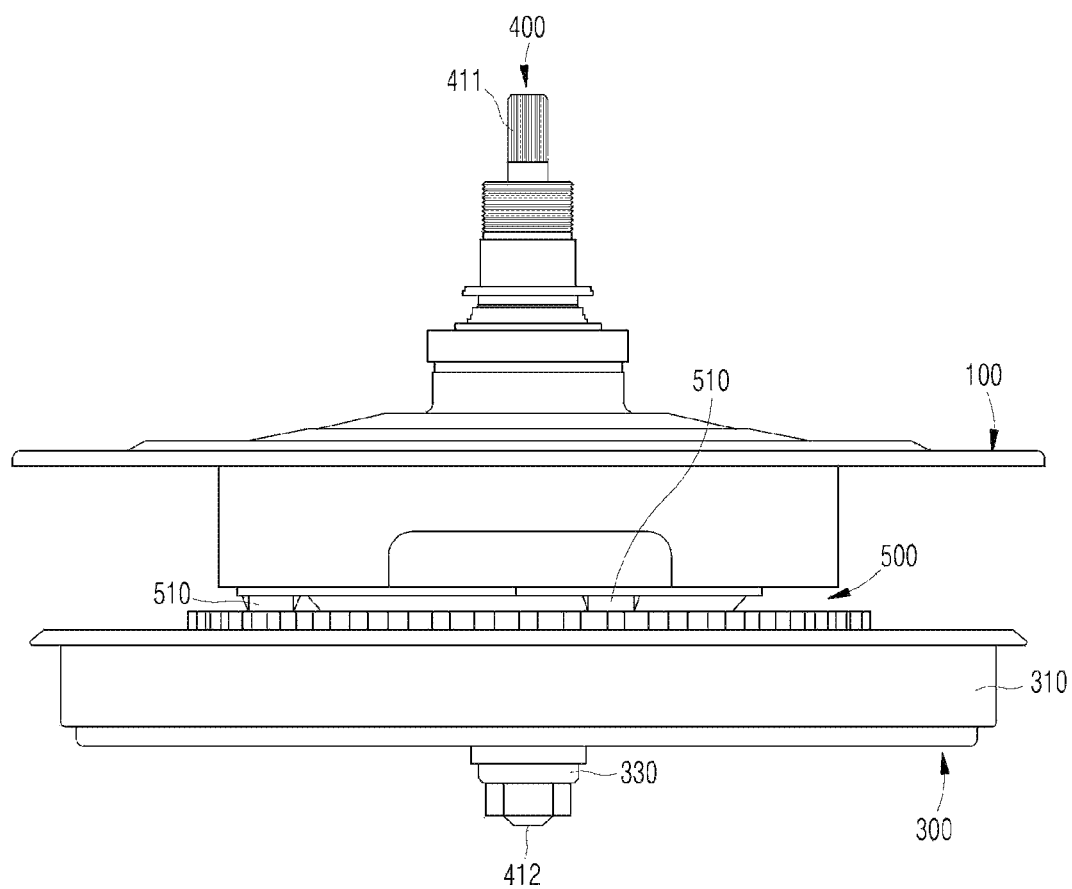
FIG. 6 is a side view illustrating the driver assembly of the top-loader washer of FIG. 4.

FIG. 4 is a cross-sectional view illustrating a top-loader washer 1 according to an embodiment of the present disclosure, FIG. 5 is a bottom perspective view illustrating an outer tub 3 and a driver assembly 10 of the top-loader washer 1 of FIG. 4, and FIG. 6 is a side view illustrating the driver assembly 10 of the top-loader washer 1 of FIG. 4.

As shown in FIG. 4, the top-loader washer 1 according to an embodiment of the present disclosure includes a case 2, an outer tub 3, an inner tub 4, a pulsator 5, and a driver assembly 10. As disclosed in Korean Patent Application Publication No. 10-2019-0063259, the case, the outer tub, the inner tub, and the pulsator are well known in the art, so detailed descriptions thereof will be omitted.

As shown in FIGS. 4 to 6, the driver assembly 10 is configured to rotate the pulsator 5 and the inner tub 4, and includes a bearing housing 100, a stator 200, a rotor 300, a rotating shaft 400, and a clutch stopper 500.

As shown in FIGS. 5 and 6, the bearing housing 100 is configured to rotatably support the rotating shaft 400 of the rotor 300, and is provided under the outer tub 3. The bearing housing 100 may be coupled to the lower surface of the outer tub 3.

Figure 7:
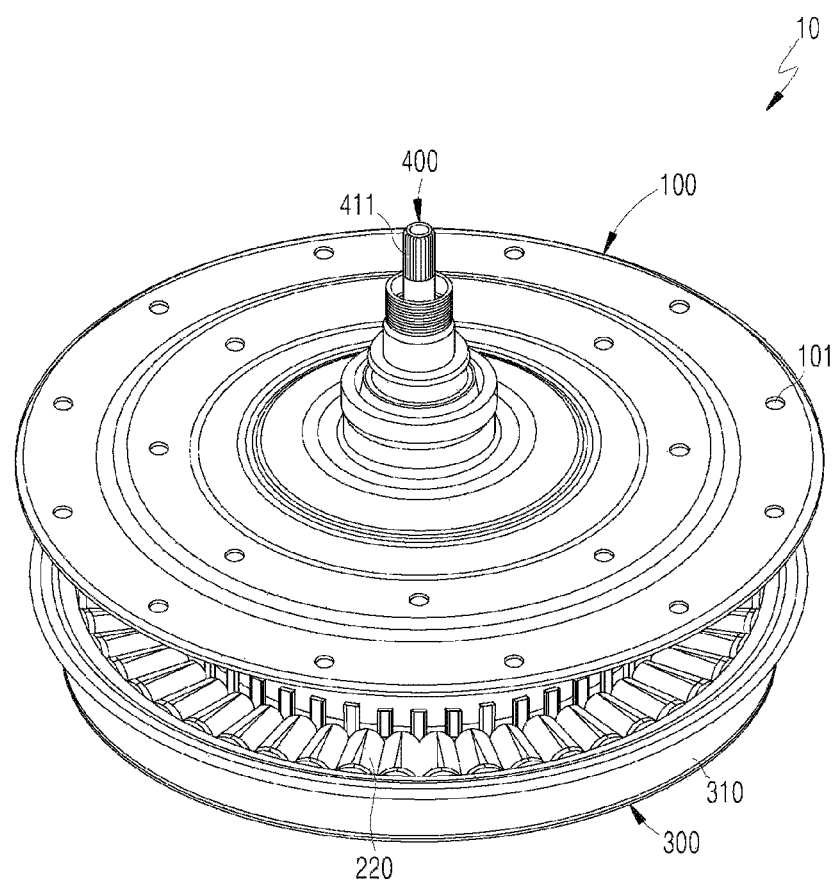
FIG. 7 is a perspective view illustrating the driver assembly of the top-loader washer of FIG. 4.
Figure 8:
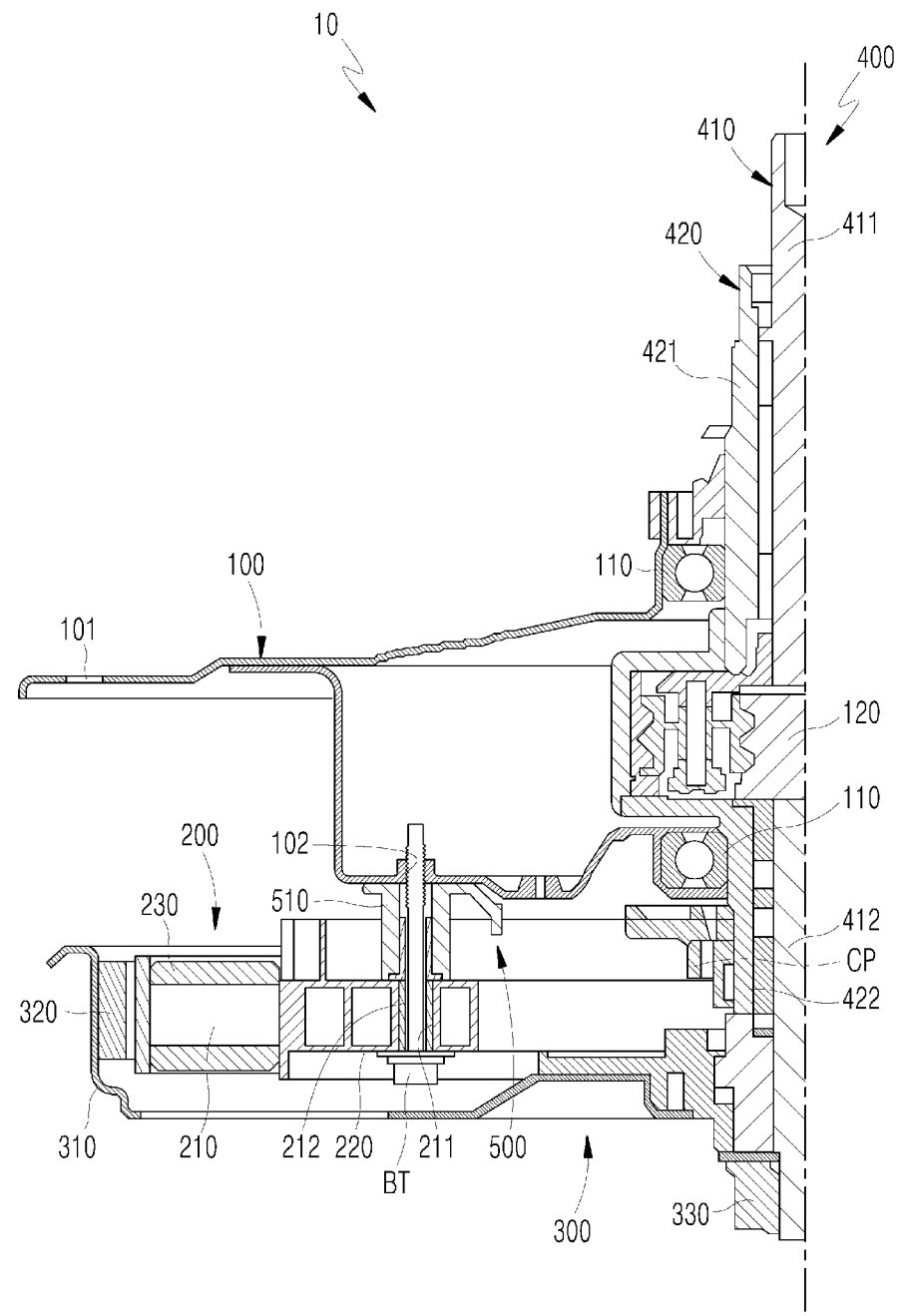
FIG. 8 is a cross-sectional view illustrating the driver assembly of the top-loader washer of FIG. 4.

FIG. 7 is a perspective view illustrating a driver assembly 10 of the top-loader washer 1 of FIG. 4, and FIG. 8 is a cross-sectional view illustrating the driver assembly 10 of the top-loader washer 1 of FIG. 4.

As shown in FIG. 7, a plurality of holes 101 may be formed in the bearing housing 100. An opening through which a bolt B is screwed may be formed under the outer tub 3. The bolt B may be screwed into the opening while being inserted into the hole 101.

As shown in FIG. 8, the bearing housing 100 accommodates a bearing 110 and a planetary gear module 120 therein. The bearing 110 rotatably supports the rotating shaft 400.

The rotating shaft 400 is configured to transmit rotational force of the rotor 300 to the pulsator 5 and the inner tub 4, and includes a washing shaft 410 and a spin-drying shaft 420. The washing shaft 410 includes an upper washing shaft 411 and a lower washing shaft 412. The spin-drying shaft 420 includes an upper spin-drying shaft 421 and a lower spin-drying shaft 422.

The planetary gear module 120 connects the upper washing shaft 411 and the lower washing shaft 412. The planetary gear module 120 decelerates the rotational speed of the upper washing shaft 411 and the upper spin-drying shaft 421 and increases the rotational force. As disclosed in Korean Patent Application Publication No. 10-2019-0063259, the washing shaft, the spin-drying shaft, the bearing, and the planetary gear module are well known in the art, so detailed technical descriptions thereof will be omitted.

As shown in FIGS. 7 and 8, the stator 200 and the rotor 300 constitute a driving motor. The stator 200 and the rotor 300 are provided under the bearing housing 100. The stator 200 includes a core 210, an insulator 220, and a coil 230.

As shown in FIG. 8, a first hole 211 is formed in the insulator 220. A first sleeve 212 is coupled to the first hole 211. The first sleeve 212 may be inserted during injection molding of the insulator 220. The first sleeve 212 imparts rigidity to the first hole 211.

As shown in FIGS. 7 and 8, the rotor 300 includes a frame 310 and a magnet 320. A shaft coupling portion 330 is provided at the center of the rotor 300. The shaft coupling portion 330 may transmit the rotational force to a coupler CP. The coupler CP is mounted to be vertically movable on the lower spin-drying shaft 422. The coupler CP is raised and lowered by a clutch mechanism.

The clutch stopper 500 is configured to limit rotation of a clutch lever, and is interposed between the bearing housing 100 and the stator 200. The clutch lever is rotatably coupled to the clutch stopper 500. As disclosed in Korean Patent Application Publication No. 10-2019-0063259, the stator, the rotor, and the clutch stopper are well known in the art, so detailed technical descriptions thereof will be omitted.

As shown in FIG. 8, the bearing housing 100, the clutch stopper 500, and the stator 200 are fastened by a bolt BT. A thread hole 102 is formed in a lower surface of the bearing housing 100. A female thread is formed on the inner surface of the thread hole 102. The bolt BT is screwed into the thread hole 102.

Figure 9:
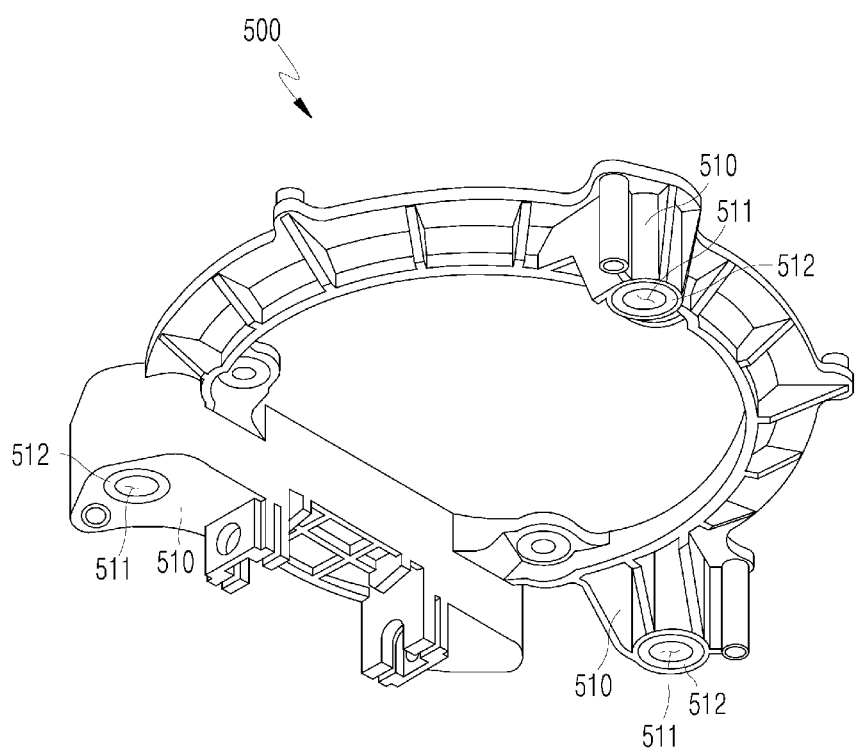
FIG. 9 is a perspective view illustrating a clutch stopper of the driver assembly of the top-loader washer of FIG. 4.
Figure 10:
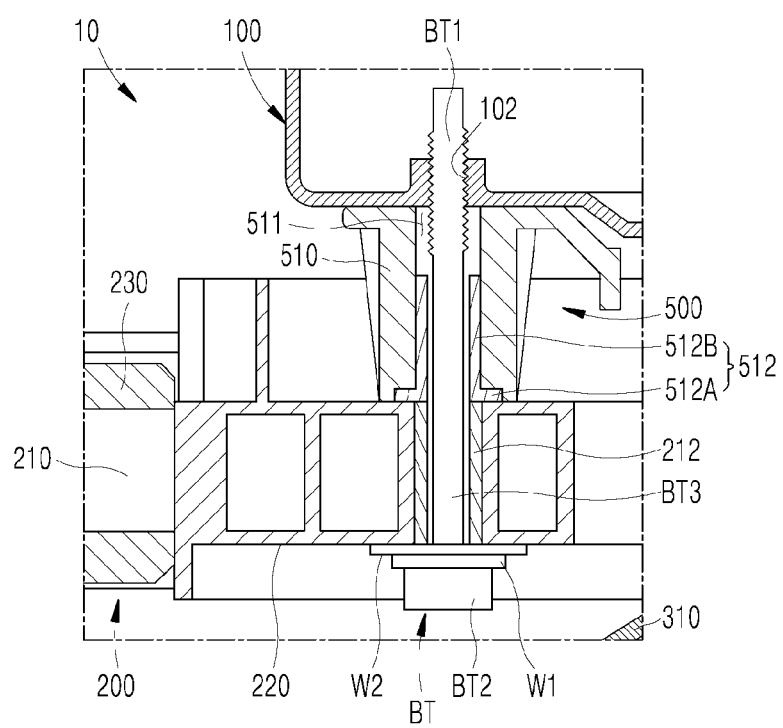
FIG. 10 is an enlarged partial view illustrating a bolt fastening portion of FIG. 9.
Figure 11:
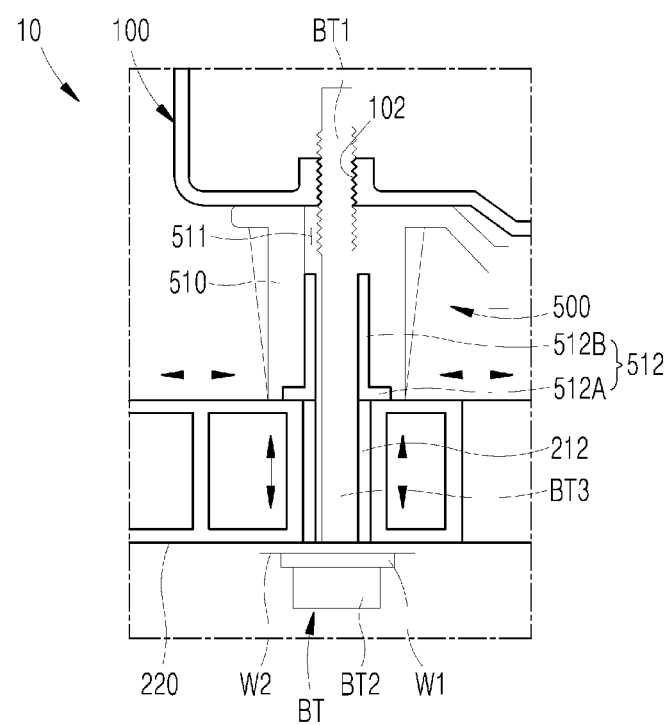
FIG. 11 is a diagram illustrating vibration transmission in the bolt fastening portion of FIG. 10.

FIG. 9 is a perspective view illustrating the clutch stopper 500 of the driver assembly 10 of the top-loader washer 1 of FIG. 4, FIG. 10 is an enlarged partial view illustrating a bolt BT fastening portion of FIG. 9, and FIG. 11 is a view illustrating vibration transmission in the bolt BT fastening portion of FIG. 10.

As shown in FIG. 9, a plurality of boss portions 510 is formed in the clutch stopper 500. A second hole 511 is formed in each boss portion 510. A second sleeve 512 is coupled to each second hole 511. The second sleeve 512 may be inserted during injection molding of the clutch stopper 500. The second sleeve 512 is made of metal. The second sleeve 512 imparts rigidity to the second hole 511.

As shown FIG. 10, the bolt BT is inserted into the first sleeve 212 and the second sleeve 512 to fasten the bearing housing 100, the clutch stopper 500, and the stator 200.

As described above, the first hole 211 is formed in the insulator 220. As shown in FIG. 10, the first sleeve 212 is coupled to the first hole 211. The first sleeve 212 has a cylindrical shape. The first sleeve 212 may be inserted during injection molding of the insulator 220.

The first sleeve 212 does not protrude upward from the top of the first hole 211. The first sleeve 212 does not protrude downward from the bottom of the first hole 211. The first sleeve 212 is made of metal. The first sleeve 212 imparts rigidity to the first hole 211. The first sleeve 212 prevents deformations of the first hole 211 and the insulator 220 that are caused by a fastening force of the bolt BT and vibration energy.

As shown in FIG. 10, the second sleeve 512 includes a ring portion 512A and a tubular portion 512B.

The ring portion 512A is a portion that is in close contact with the top surface of the first sleeve 212, and has a ring shape. A lower surface of the ring portion 512A is formed as a flat surface in a ring shape, with which the top surface of the first sleeve 212 is in close contact. The first sleeve 212 and the tubular portion 512B have the same diameter. The ring portion 512A is formed in a radially extended shape and at the bottom of the tubular portion 512B.

Figure 1:
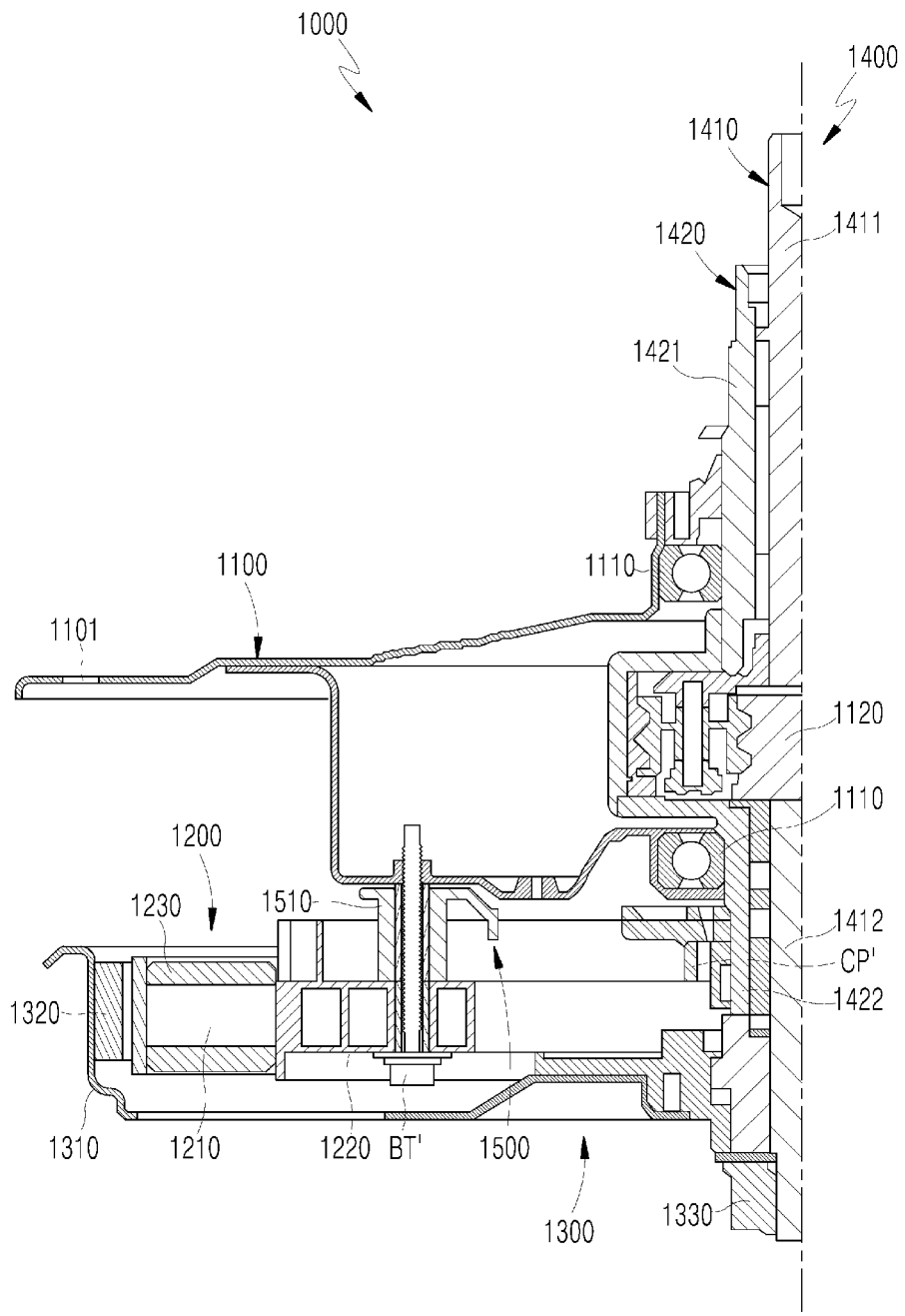
FIG. 1 is a cross-sectional view illustrating a conventional driver assembly.
Figure 2:
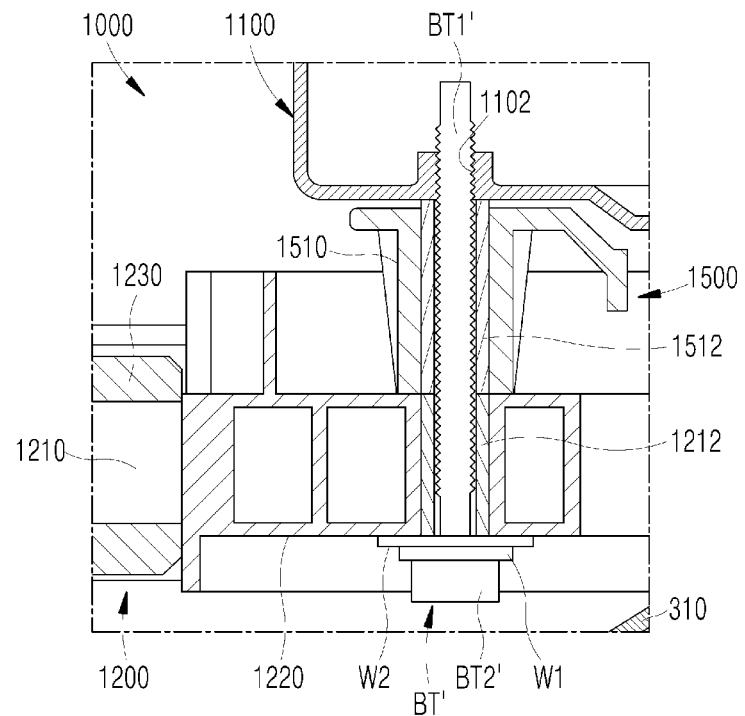
FIG. 2 is an enlarged partial view illustrating a bolt fastening portion of FIG. 1.
Figure 3:
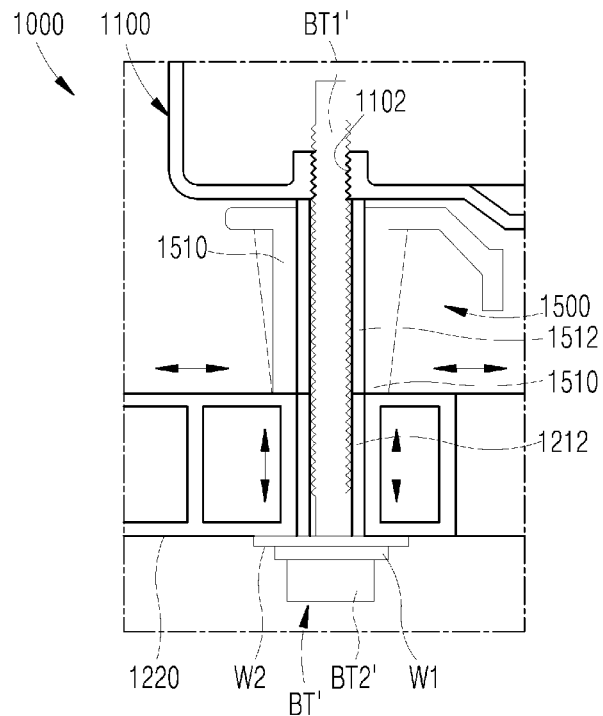
FIG. 3 is a diagram illustrating vibration transmission in the bolt fastening portion of FIG. 2.

Referring to FIG. 2, in Related Art 2, the sleeve A 1512 and sleeve B 1212 have the same cylindrical shape. As shown in FIGS. 3 and 11, when the clutch stopper 500, and the stator 200 move (finely) relative to each other in the horizontal direction by the vibration energy in the motor (hereinafter referred to as a 'case A'), the area where the lower surface of the ring portion 512A and the top surface of the first sleeve 212 contact each other is larger than the area where the lower surface of the sleeve A 1512 and the lower surface of the sleeve B contact each other.

This means that under the condition of case A, the clutch stopper 500 and stator 200 of the present disclosure causes a greater frictional force in the horizontal direction than the clutch stopper 1500 and stator 1200 in Related Art 2. That is, under the condition of case A, the clutch stopper 500 and stator 200 of the present disclosure causes a stronger fastening force in the horizontal direction than the clutch stopper 1500 and stator 1200 in Related Art 2.

Therefore, the clutch stopper 500 and stator 200 of the present disclosure may block relative movement therebetween even when greater vibration energy is applied in the horizontal direction than the clutch stopper 1500 and stator 1200 in Related Art 2.

As shown in FIG. 10, in the state in which the bearing housing 100, the clutch stopper 500, and the stator 200 are fastened by the bolt BT (hereinafter referred to as a 'fastened state'), the lower surface of the ring portion 512A forms a contact surface with the upper surface of the insulator 220 around the first sleeve 212. That is, in the fastened state, the lower surface of the ring portion 512A is in close contact with the top surface of the first sleeve 212 and the upper surface of the insulator 220 to form a friction force in the horizontal direction.

The bottom of the second hole 511 forms a step with the lower surface of the boss portion 510. The ring portion 512A is provided in the step. The upper surface of the ring portion 512A forms an annular contact surface with the boss portion 510 within the step. Accordingly, even when the first sleeve 212 pushes the second sleeve 512 upward in the fastened state, the tubular portion 512B is not pushed toward the bearing housing 100.

The lower surface of the boss portion 510 forms a contact surface with the insulator 220 around the ring portion 512A. The ring portion 512A is formed in a radially extended shape at the bottom of the tubular portion 512B. The lower surface of the boss portion 510 extends radially more than the lower surface of the fastening boss 1510 in Related Art 2.

In the stator 200 and the clutch stopper 500 in the fastened state, contact surfaces are respectively formed between (1) the first sleeve 212 and the ring portion 512A, (2) the insulator 220 and the ring portion 512A, and (3) the boss portion 510 and the insulator 220. Therefore, the clutch stopper 500 and stator 200 of the present disclosure may block relative movement therebetween even when greater vibration energy is applied in the horizontal direction than the clutch stopper 1500 and stator 1200 in Related Art 2.

The tubular portion 512B extends upward from ring portion 512A. The tubular portion 512B is provided in the second hole 511. The top of the tubular portion 512B is provided under the upper surface of the boss portion 510. In the fastened state, even when the first sleeve 212 and the second sleeve 512 are in close contact with each other by a fastening force of the bolt BT, the second sleeve 512 is kept spaced apart from the bearing housing 100.

As shown in FIG. 11, in the fastened state, the first sleeve 212 and the second sleeve 512 are in close contact with each other vertically by the fastening force of the bolt BT. In the fastened state, the boss portion 510 is in close contact with the lower surface of the bearing housing 100 around the top of the second hole 511 by the fastening force of the bolt BT.

Referring to FIGS. 2 and 10, the boss portion 510 extends radially more than the conventional fastening boss 1510. Therefore, the boss portion 510 has reinforced rigidity to resist vibration energy and the fastening force of the bolt BT, compared to the conventional fastening boss 1510.

Referring to FIG. 3, Related Art 2 discloses a configuration that reduces the area where vibration energy generated in the driving motor is transmitted to the bearing housing 1100 through the clutch stopper 1500, by protruding the sleeve A 1512 by about 1 mm from the upper surface of the fastening boss 1510.

However, according to the results of an analysis of noise of the washer actually conducted by the present applicant, most noise generated in the conventional driver 1000 was generated in (1) a contact surface between the sleeve A 1512 and the bearing housing 1100, and (2) a contact surface between the fastening member BT' and the sleeve A 1512 and the sleeve B 1212.

The fastening member BT', the sleeve A 1512, the sleeve B 1212, and the bearing housing 1100 are all made of metal. That is, most noise generated by the driver 1000 may be summarized as being generated in the contact surface between metals of the fastening portions. Accordingly, the present applicant has studied a method capable of securing the strength of the fastening portion while reducing the contact surface area between metals of the fastening portions.

As shown in FIG. 11, in the fastened state, the first sleeve 212 and the second sleeve 512 are in close contact with each other vertically by the fastening force of the bolt BT. In the fastened state, even when the first sleeve 212 and the second sleeve 512 are in close contact with each other by the fastening force of the bolt BT, the second sleeve 512 is kept spaced apart from the bearing housing 100.

In the driver assembly 10 of the present disclosure, since the second sleeve 512 and the bearing housing 100 do not come into contact with each other, metals of the fastening portions may not come into contact with each other.

Vibration energy of the stator 200 is transmitted to the bearing housing 100 through the boss portion 510 made of synthetic resin rather than the second sleeve 512 made of metal. Vibration energy of the stator 200 is dissipated in a substantial amount through the boss portion 510 made of synthetic resin, and then transferred to the bearing housing 100. Therefore, noise due to vibration of the stator 200 is greatly reduced.

As shown in FIG. 11, the bolt BT includes a thread BT1, a head BT2, and a body BT3.

The thread BT1 is a portion that is screwed into the bearing housing 100. A male thread is formed on the outer surface of the thread BT1. A thread hole 102 is formed on the lower surface of the bearing housing 100. A female thread is formed on the inner surface of the thread hole 102.

The thread BT1 is screwed into the thread hole 102. In the fastened state, the thread BT1 is spaced vertically apart from the first sleeve 212 and the second sleeve 512. That is, in the fastened state, a top of the tubular portion 512B is positioned under the thread BT1.

In the fastened state, the head BT2 pushes the stator 200 toward the bearing housing 100. A spring washer W1 and a flat washer W2 may be mounted on the bolt BT.

The body BT3 connects the thread BT1 and the head BT2. The male thread is not formed on the outer surface of the body BT3. The body BT3 has a smaller diameter than a screw thread of the thread BT1. The body BT3 may have a smaller diameter than a screw valley of the thread BT1.

The body BT3 has a diameter smaller than an inner diameter of the first sleeve 212 and the tubular portion 512B. Therefore, the body BT3 is horizontally spaced from the first sleeve 212 and the second sleeve 512. Therefore, it is possible to reduce the contact surface area between metals of the fastening portions.

Referring to FIG. 2, the bolt BT' of Related Art 2 includes a thread BT1' and a head BT2'. As shown in FIGS. 2 and 10, the bolt BT and the first sleeve 212 and the second sleeve 512 are more spaced apart in the horizontal direction than the bolt BT' and the sleeve A 1512 and the sleeve B 1212.

Thus, as shown in FIGS. 3 and 11, under the condition of case A, the probability of contact between the first sleeve 212 and the second sleeve 512 and the bolt BT is lower than the probability of contact between sleeve A 1512 and sleeve B 1212 and bolt BT'.

As a result, the driver assembly 10 of the present disclosure may block the contact between the bolt BT and the first sleeve 212 and the second sleeve 512 even when greater vibration energy is applied in the horizontal direction. Therefore, noise caused by vibration of the stator 200 is greatly reduced.

Figure 12:
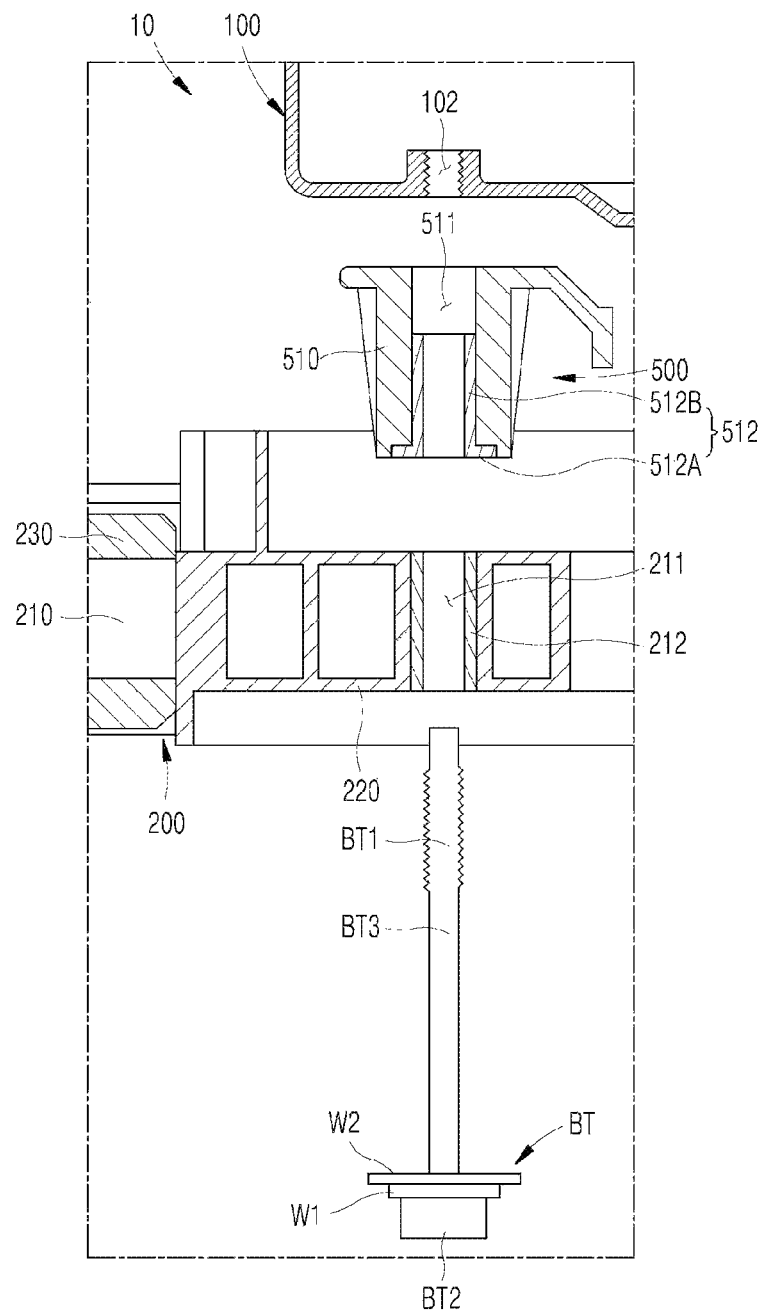
FIG. 12 is an exploded view of the bolt fastening portion of FIG. 10.

FIG. 12 is an exploded view of the blot fastening portion of FIG. 10.

Figure 13:
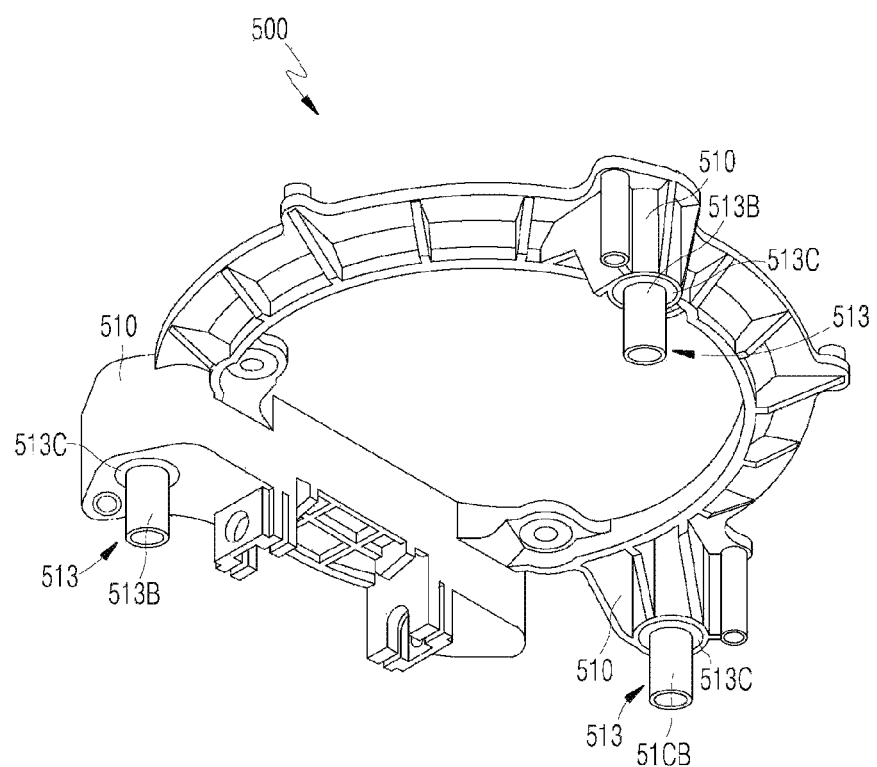
FIG. 13 is a perspective view illustrating a clutch stopper according to another embodiment of the present disclosure.
Figure 14:
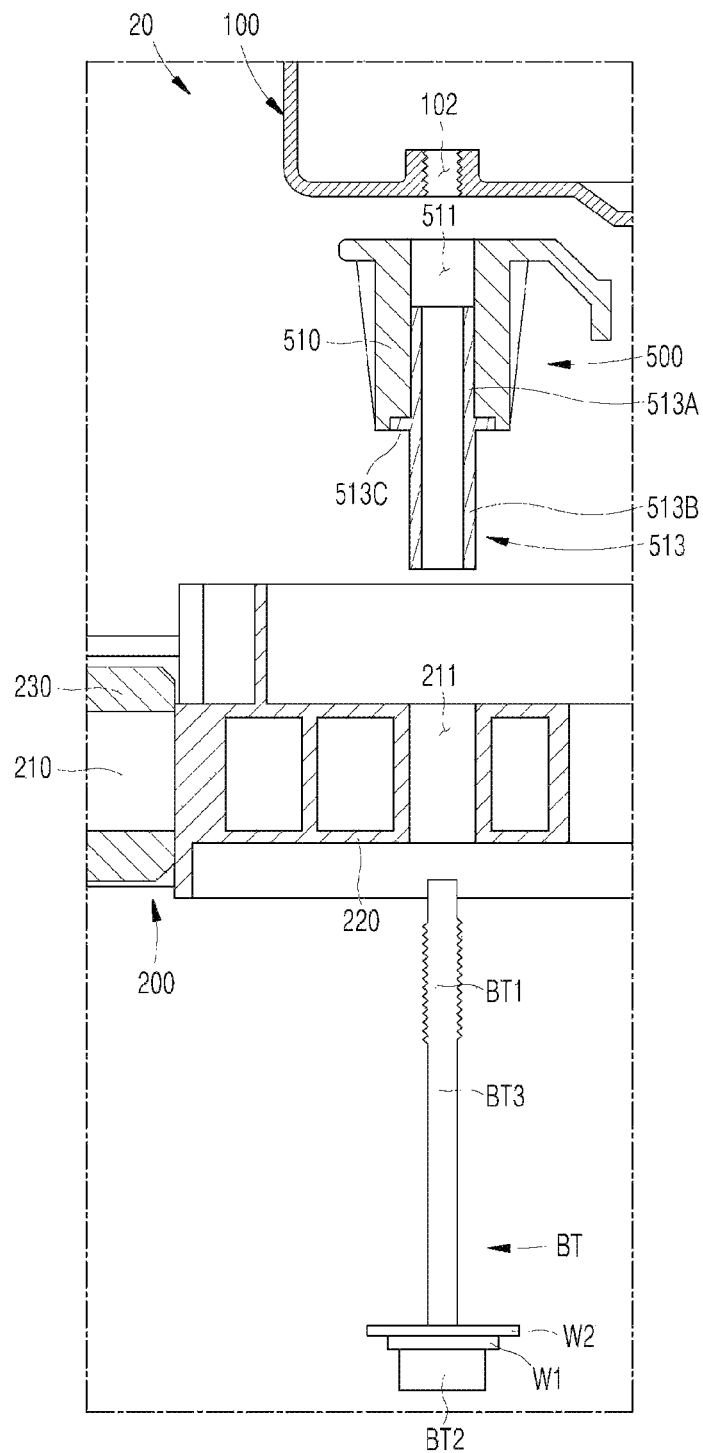
FIG. 14 is an exploded view of the bolt fastening portion according to another embodiment of the present disclosure.
Figure 15:
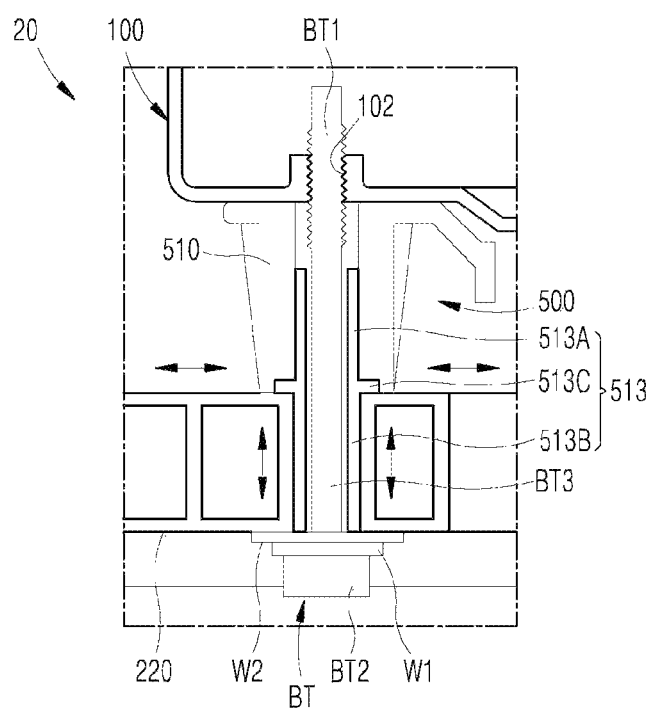
FIG. 15 is a diagram illustrating vibration transmission in the bolt fastening portion of FIG. 14.

FIG. 13 is a perspective view illustrating a clutch stopper 500 according to another embodiment of the present disclosure, FIG. 14 is an exploded view of a bolt BT fastening portion according to another embodiment of the present disclosure, and FIG. 15 is a diagram illustrating vibration transmission in the bolt BT fastening portion of FIG. 14.

As shown in FIGS. 13 and 14, in the driver assembly 20 according to the other embodiment of the present disclosure, a sleeve 513 is coupled to a second hole 511 of the clutch stopper 500. The sleeve 513 may be inserted during injection molding of the clutch stopper 500.

As shown in FIG. 14, the sleeve 513 includes a coupling portion 513A, an insertion portion 513B, and an extension portion 513C.

The extension portion 513C has a ring shape. The extension portion 513C extends radially from an outer surface of a bottom of the coupling portion 513A. The lower surface of the extension portion 513C forms a contact surface with the top surface of the insulator 220 around the insertion portion 513B. The lower surface of the extension portion 513C is formed as a flat surface in a ring shape, with which the top surface of the insulator 220 is in close contact.

The bottom of the second hole 511 forms a step with the lower surface of the boss portion 510. The extension portion 513C is provided in the step. The upper surface of the extension portion 513C forms an annular contact surface with the boss portion 510 within the step. Therefore, in the fastened state, even when the head BT2 of the bolt BT pushes the sleeve 513 upward, the coupling portion 513A is not pushed toward the bearing housing 100.

The lower surface of the boss portion 510 forms a contact surface with the insulator 220 around the extension portion 513C. The extension portion 513C is formed in a radially extended shape and at the bottom of the coupling portion 513A. The lower surface of the boss portion 510 extends radially more than the lower surface of the fastening boss 1510 in Related Art 2.

As shown in FIG. 14, the coupling portion 513A extends upward from the extension portion 513C. The coupling portion 513A is provided in the second hole 511. The top of the coupling portion 513A is provided under the upper surface of the boss portion 510. In the fastened state, even when the head BT2 of the bolt BT pushes the sleeve 513 upward, the sleeve 513 is kept spaced apart from the bearing housing 100.

The insertion portion 513B is a portion that is inserted into the first hole 211, and is formed on the opposite side of the coupling portion 513A with respect to the extension portion 513C. The insertion portion 513B and the coupling portion 513A have the same diameter.

The insertion portion 513B has a cylindrical shape. In the fastened state, the insertion portion 513B imparts rigidity to the first hole 211. The insertion portion 513B prevents deformations of the first hole 211 and the insulator 220 that are caused by a fastening force of the bolt BT and vibration energy.

The boss portion 510 is in close contact with the lower surface of the bearing housing 100 around the top of the second hole 511 by the fastening force of the bolt BT. Referring to FIGS. 2 and 15, the boss portion 510 extends radially more than the conventional fastening boss 1510. Therefore, the boss portion 510 has reinforced rigidity to resist the fastening force of the bolt BT and vibration energy, compared to the conventional fastening boss 1510.

Referring to FIG. 3, Related Art 2 discloses a configuration that reduces the area where vibration energy generated in the driving motor is transmitted to the bearing housing 1100 through the clutch stopper 1500, by protruding the sleeve A 1512 by about 1 mm from the upper surface of the fastening boss 1510, However, according to the results of an analysis of noise of the washer actually conducted by the present applicant, most noise generated in the conventional driver 1000 was generated in (1) a contact surface between the sleeve A 1512 and the bearing housing 1100, and (2) a contact surface between the fastening member BY and the sleeve A 1512 and the sleeve B 1212.

The fastening member BY, the sleeve A 1512, the sleeve B 1212, and the bearing housing 1100 are all made of metal. That is, most noise generated in the driver 1000 may be summarized as being generated at the contact surface between metals of the fastening portions. Accordingly, the present applicant has studied a method capable of securing the strength of the fastening portion while reducing the contact surface area between metals of the fastening portions.

Referring to FIG. 2, in Related Art 2, the sleeve A 1512 and the sleeve B 1212 form a friction force in the horizontal direction by a fastening force of the bolt Br. In the driver assembly 20 according to the other embodiment of the present disclosure, the coupling portion 513A and the insertion portion 513B are integrally manufactured. Therefore, the contact between the bolt BT and the sleeve 513 may be blocked even when greater vibration energy is applied in the horizontal direction. Therefore, noise caused by vibration of the stator 200 is greatly reduced.

In addition, in the driver assembly 20 according to the other embodiment of the present disclosure, since the sleeve 513 and the bearing housing 100 do not come into contact with each other, metals of the fastening portions may not come into contact with each other.

Vibration energy of the stator 200 is transmitted to the bearing housing 100 through the boss portion 510 made of synthetic resin rather than the sleeve 513 made of metal. Vibration energy of the stator 200 is dissipated in a substantial amount through the boss portion 510 made of synthetic resin, and then transferred to the bearing housing 100. Therefore, noise due to vibration of the stator 200 is greatly reduced.

While the foregoing has been given by way of illustrative example of the present disclosure, all such and other modifications and variations thereto as would be apparent to those skilled in the art are deemed to fall within the broad scope and ambit of this disclosure as is herein set forth. Accordingly, such modifications or variations are not to be regarded as a departure from the spirit or scope of the present disclosure, and it is intended that the present disclosure cover the modifications and variations of this invention provided they come within the scope of the appended claims and their equivalents.

What is claimed is:

1. A driver assembly of a top-loader washer, comprising:
a bearing housing provided under an outer tub and having a bolt screwed into a lower surface of the bearing housing;
a stator provided under the bearing housing and defining a first hole;
a clutch stopper interposed between the bearing housing and the stator and defining a second hole;
a first sleeve coupled to the first hole; and
a second sleeve coupled to the second hole,
wherein the bolt is inserted into the first sleeve through the first hole and into the second sleeve through the second hole to fasten the bearing housing, the clutch stopper, and the stator, and
wherein the second sleeve is spaced apart from the bearing housing based on the first sleeve and the second sleeve being fastened to and in contact with each other by a fastening force of the bolt.

2. The driver assembly of claim 1, wherein the second sleeve comprises:
a ring portion in contact with a top surface of the first sleeve; and
a tubular portion extending upward from the ring portion and spaced apart from the bearing housing,
wherein an upper surface of the ring portion provides an annular contact surface configured to come in contact with the clutch stopper such that the tubular portion is not pushed toward the bearing housing.

3. The driver assembly of claim 2, wherein a lower surface of the ring portion provides a contact surface configured to come in contact with the stator around the first sleeve.

4. The driver assembly of claim 2, wherein the clutch stopper comprises a boss portion providing the second hole, and
wherein a lower surface of the boss portion provides a contact surface configured to come in contact with the stator around the ring portion.

5. The driver assembly of claim 4, wherein the boss portion is made of synthetic resin.

6. The driver assembly of claim 1, wherein the clutch stopper is in contact with the bearing housing around a top of the second hole by the fastening force of the bolt.

7. The driver assembly of claim 1, wherein the bolt comprises:

a threaded portion screwed into the bearing housing and spaced vertically apart from the first sleeve and the second sleeve;
a head pushing the stator toward the bearing housing; and
a body connecting the threaded portion and the head, and spaced apart in a horizontal direction from the first sleeve and the second sleeve.

8. The driver assembly of claim 1, wherein the first sleeve and the second sleeve are made of metal.

9. The driver assembly of claim 1, wherein the first sleeve has a cylindrical shape.

10. The driver assembly of claim 1, wherein the first sleeve does not protrude upward from a top of the first hole and does not protrude downward from a bottom of the first hole.

11. A top-loader washer comprising a driver assembly according to claim 1.

12. A driver assembly of a top-loader washer, comprising:
a bearing housing provided under an outer tub and having a bolt screwed into a lower surface of the bearing housing;
a stator provided under the bearing housing and providing a first hole;
a clutch stopper interposed between the bearing housing and the stator and providing a second hole, and
a sleeve coupled to the second hole and comprising (i) a coupling portion coupled to the second hole and (ii) an insertion portion inserted into the first hole,
wherein the bolt is inserted into the sleeve through the second hole to fasten the bearing housing, the clutch stopper, and the stator, and
wherein the coupling portion is spaced apart from the bearing housing.

13. The driver assembly of claim 12, wherein the sleeve comprises:
an extension portion protruding radially from an outer surface of a bottom of the coupling portion, and
an upper surface of the extension portion providing an annular contact surface configured to come in contact with the clutch stopper such that the coupling portion is not pushed toward the bearing housing.

14. The driver assembly of claim 13, wherein the clutch stopper comprises a boss portion providing the second hole, and
wherein a lower surface of the boss portion provides a contact surface configured to come in contact with the stator around the extension portion.

15. The driver assembly of claim 14, wherein the boss portion is made of synthetic resin.

16. The driver assembly of claim 13, wherein the extension portion has a ring shape.

17. The driver assembly of claim 13, wherein a lower surface of the extension portion provides a flat surface.

18. The driver assembly of claim 13, wherein a lower surface of the extension portion provides a contact surface configured to come in contact with the stator around the insertion portion.

19. The driver assembly of claim 12, wherein the insertion portion has a cylindrical shape.

20. The driver assembly of claim 12, wherein the coupling portion and the insertion portion have a same diameter.

* * * * *